United States Patent
Wright, III et al.

(10) Patent No.: US 10,314,245 B2
(45) Date of Patent: Jun. 11, 2019

(54) IRRIGATION SPRINKLER WITH TURF CUP

(71) Applicant: The Toro Company, Bloomington, MN (US)

(72) Inventors: James T. Wright, III, Riverside, CA (US); Steven C. Renquist, Norco, CA (US)

(73) Assignee: The Toro Company, Bloomington, MN (US)

( * ) Notice: Subject to any disclaimer, the term of this patent is extended or adjusted under 35 U.S.C. 154(b) by 88 days.

(21) Appl. No.: 15/426,011

(22) Filed: Feb. 6, 2017

(65) Prior Publication Data

US 2017/0223905 A1   Aug. 10, 2017

Related U.S. Application Data

(60) Provisional application No. 62/292,070, filed on Feb. 5, 2016.

(51) Int. Cl.
| | |
|---|---|
| *B05B 15/16* | (2018.01) |
| *A01G 9/02* | (2018.01) |
| *A01G 20/00* | (2018.01) |
| *B05B 15/622* | (2018.01) |
| *B05B 15/74* | (2018.01) |

(52) U.S. Cl.
CPC ............... *A01G 9/02* (2013.01); *A01G 20/00* (2018.02); *B05B 15/16* (2018.02); *B05B 15/622* (2018.02); *B05B 15/74* (2018.02)

(58) Field of Classification Search
CPC ........ A01G 9/02; A01G 20/00; B05B 15/622; B05B 15/16
USPC ...... 239/201, 203–206, 211, 288–288.5, 289
See application file for complete search history.

(56) References Cited

U.S. PATENT DOCUMENTS

| | | | | |
|---|---|---|---|---|
| 3,709,435 A | * | 1/1973 | Sheets ..................... | B05B 15/74 239/206 |
| 4,014,502 A | * | 3/1977 | Sheets ..................... | B05B 15/70 239/206 |
| 4,429,832 A | * | 2/1984 | Sheets ..................... | B05B 15/74 239/204 |
| 4,752,033 A | * | 6/1988 | Groendyke ............. | B05B 15/70 239/288 |
| 5,137,307 A | * | 8/1992 | Kinsey .................... | B05B 15/70 239/201 |
| 6,439,476 B1 | | 8/2002 | Boggs | |
| 8,616,467 B1 | | 12/2013 | Leavitt | |

OTHER PUBLICATIONS

Turfbusiness, http://turfbusiness.co.uk/product-news/toro-irrigation-distributor-launches-new-artificial-turf-sprinkler-cover Feb. 5, 2013, 2pgs.
Lawn&Landscape, http://www.lawnandlandscape.com/article/ll-110612-toro-evolution-controller, Nov. 6, 2012 8pgs.
The Toro Company, https://cdn2.toro.com/en/~/media/Files/Toro/professional-contractor/Rotors/TS90-Series/12-1080-ts90-sell-sheet.ashx, 2012, pp. 2.
Rainbird,https://web.archive.org/web/20100705221644/http://www.rainbird.com/landscape/products/rotors/sodCup.htm, Jul. 5, 2010, 1pg.

* cited by examiner

*Primary Examiner* — Steven J Ganey
(74) *Attorney, Agent, or Firm* — Inskeep IP Group, Inc.

(57) ABSTRACT

A turf cup is described that is mounted to a top of an irrigation sprinkler. The turf cup includes an outer sleeve and a plurality of drainage passages.

20 Claims, 15 Drawing Sheets

IRRIGATION SPRINKLER WITH TURF CUP

RELATED APPLICATIONS

This application claims priority to U.S. Provisional Application Ser. No. 62/292,070 filed Feb. 5, 2016 entitled Irrigation Sprinkler with Turf Cup, which is hereby incorporated herein by reference in its entirety.

BACKGROUND OF THE INVENTION

Irrigation sprinklers provide water to nearby areas of turf and vegetation. However, some types of turf require that the irrigation sprinkler be hidden and discreet when not in use. For example, turf used for football, baseball, soccer, and/or golf must provide a uniform surface or else a player may either trip or the sport's ball may be affected during play. Some prior art sprinklers have addressed this issue by providing a relatively thin top cover with artificial turf. This top cover is attached to the top of the riser and is relatively uniform with the nearby turf when not in user. When the irrigation sprinkler is activated, the riser and the artificial turf cover rise above the nearby turf.

However, these artificial turf covers can still interfere with performance in a sport. For example, a golf ball will normally bounce very little on the natural turf of a golf course. However, the plastic tops of the irrigation sprinklers, and even those with artificial turf tops, can cause a golf ball to otherwise bounce and/or unnaturally change course. Since golf courses often require many irrigation sprinklers to maintain their turf, these sprinklers can interfere with both performance and enjoyment of a sport such as golf.

SUMMARY OF THE INVENTION

One embodiment of the present invention is directed to a turf cup mountable on a riser of an irrigation sprinkler. The turf cup includes a lower insert fixed to a bottom of the cup and includes a plurality of apertures. A sleeve is fixed to a top of the sprinkler and surrounds the turf cup, preventing adjacent turf from being washed out during operation of the sprinkler. The insert, turf cup, and sleeve, all include apertures and channels to allow water to drain from the turf cup and/or the sleeve.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

As seen in FIGS. 1-24, one embodiment of the present invention is directed to a turf cup assembly 100 mounted to a top of an irrigation sprinkler 101 and that contains real, growing turf 104. In this respect, the turf 104 within the cup assembly 100 has a similar look, feel, and performance as the surrounding turf.

Figure 1:
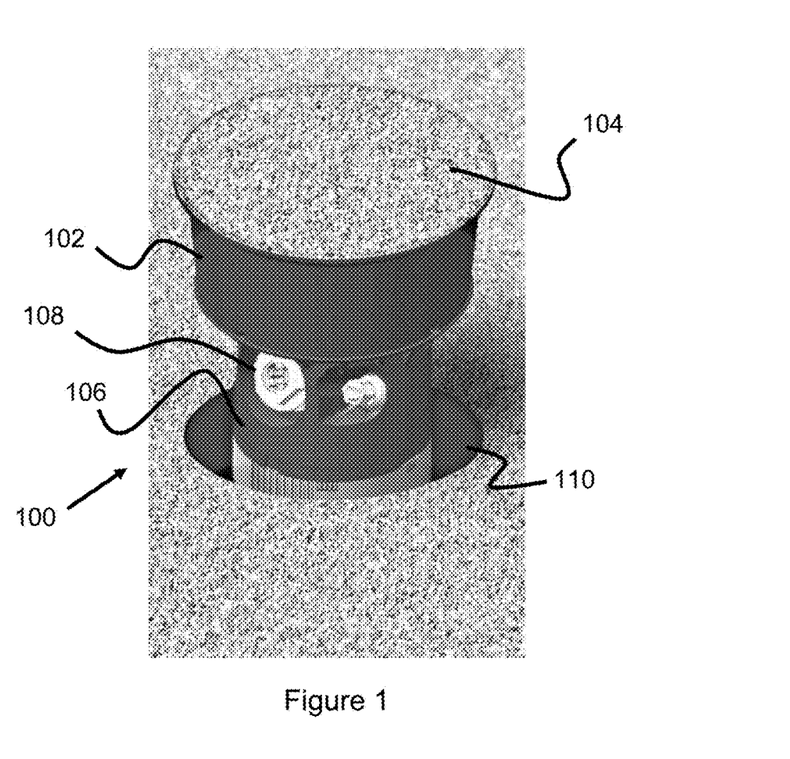
FIG. 1-3 illustrates a sprinkler with a turf cup, according to the present invention.
Figure 2:
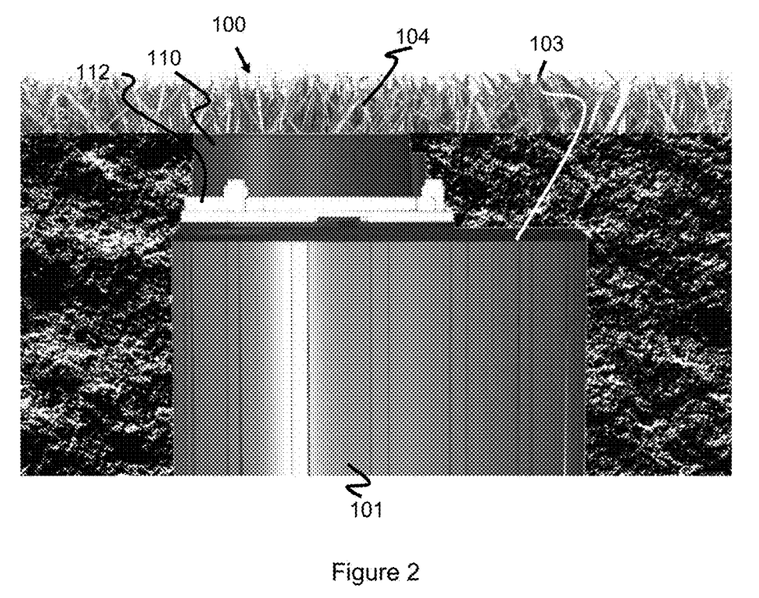
Figure 3:
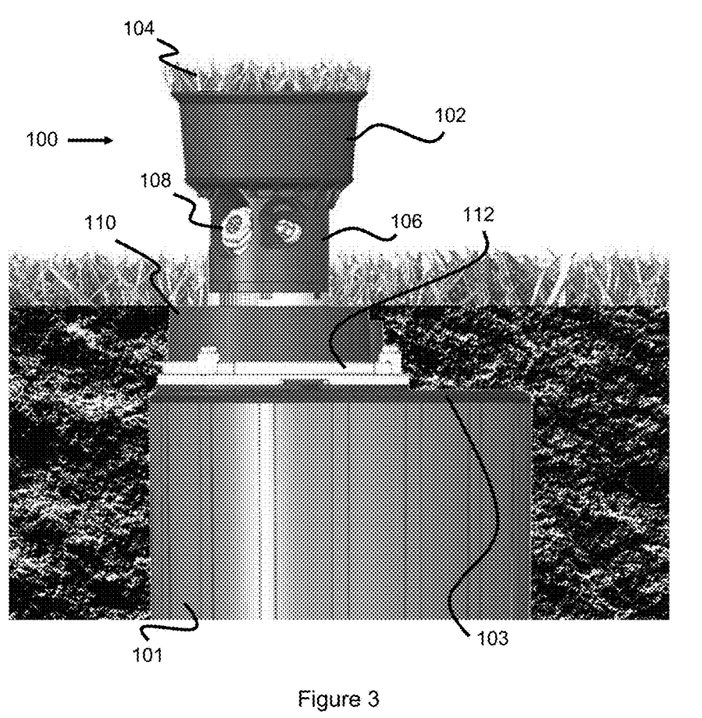
Figure 4:
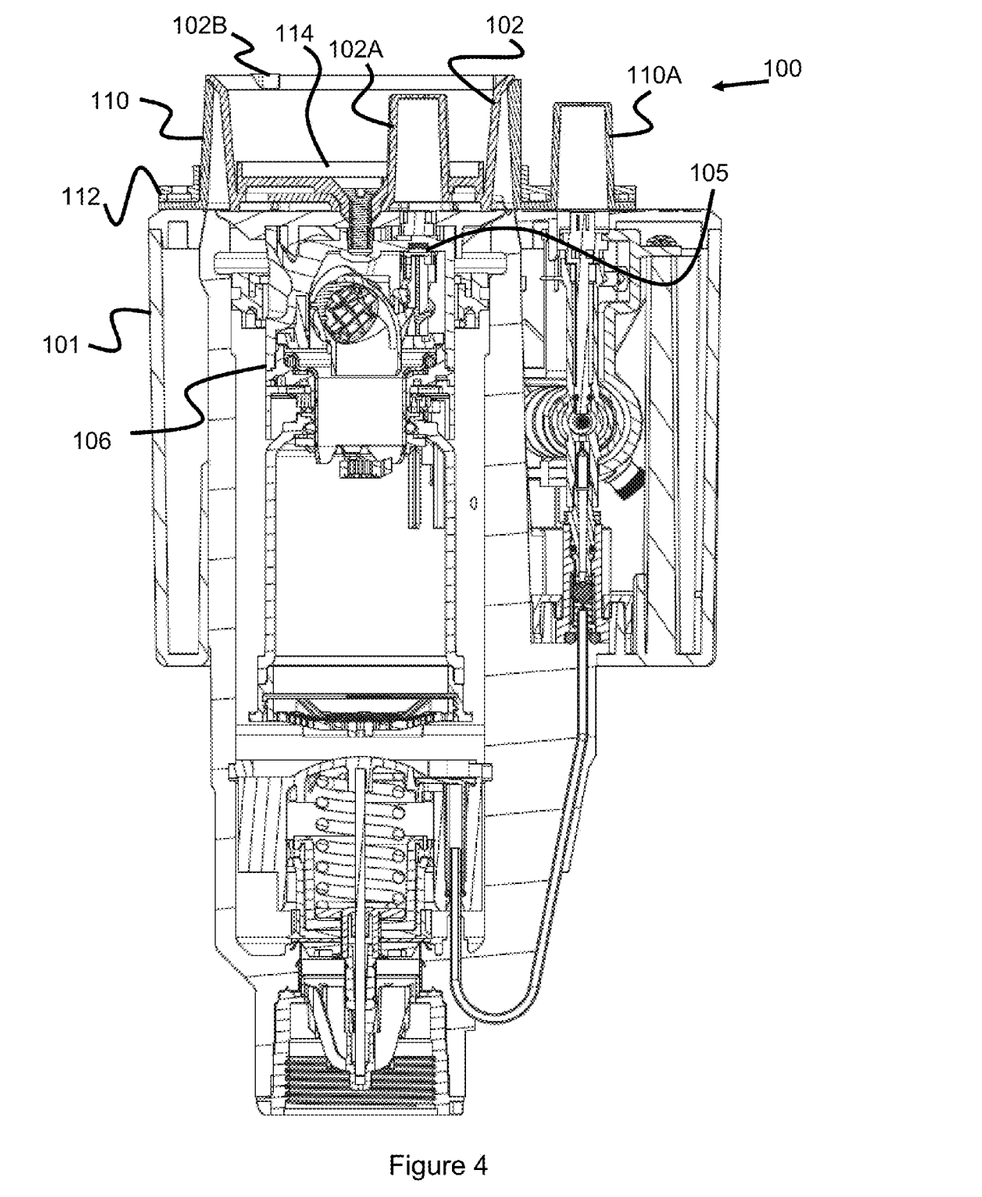
FIGS. 4-6 illustrates a cross sectional view of a sprinkler with a turf cup, according to the present invention.
Figure 5:
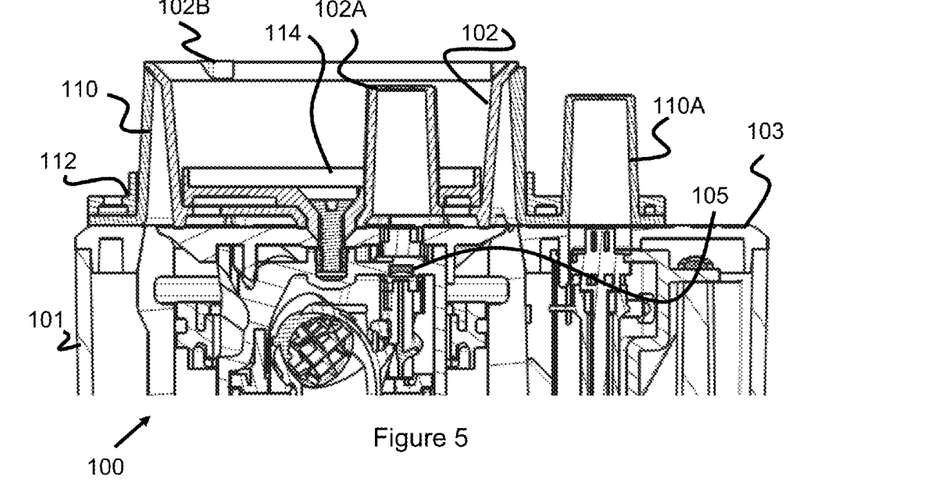
Figure 6:
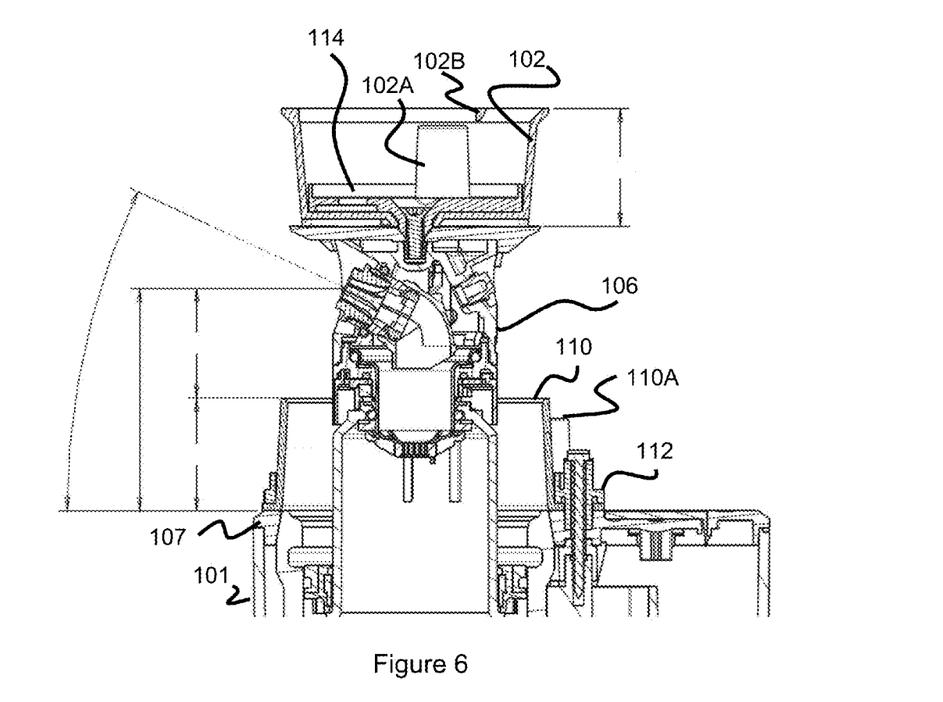
Figure 7:
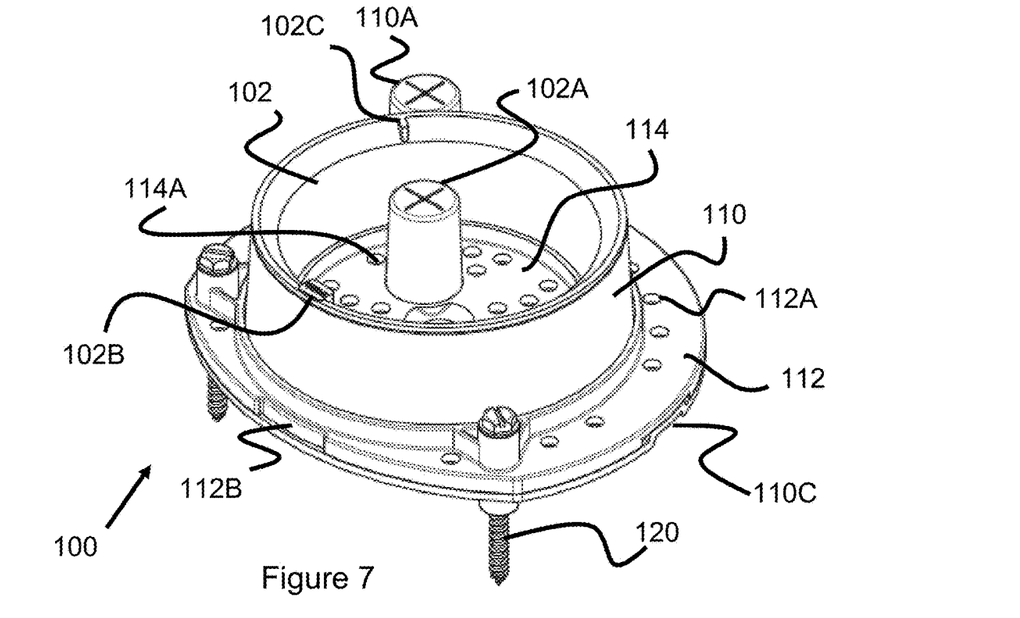
FIGS. 7-21 illustrates various components of a turf cup, according to the present invention.
Figure 8:
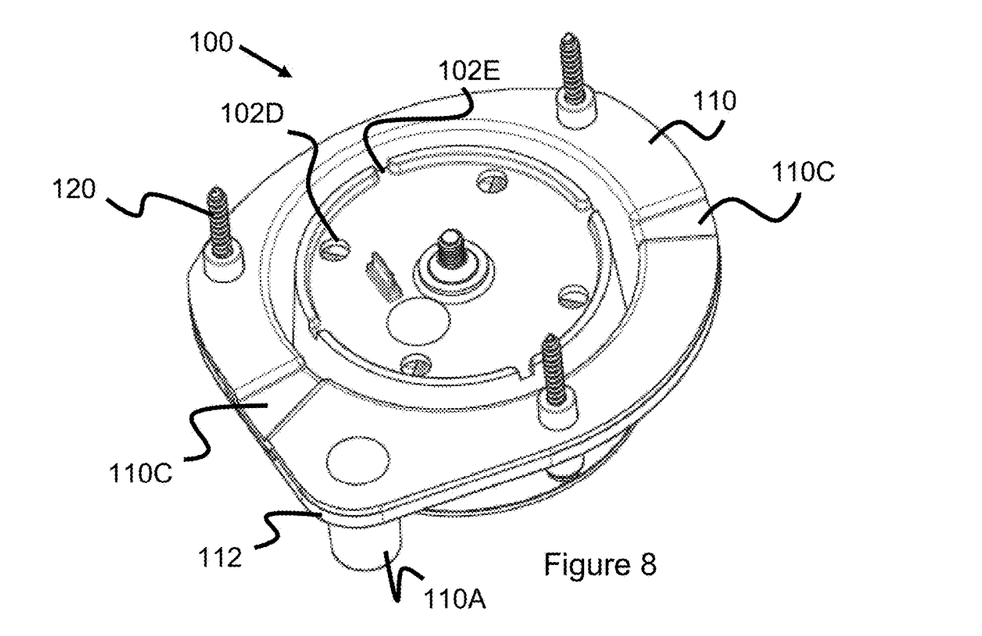
Figure 9:
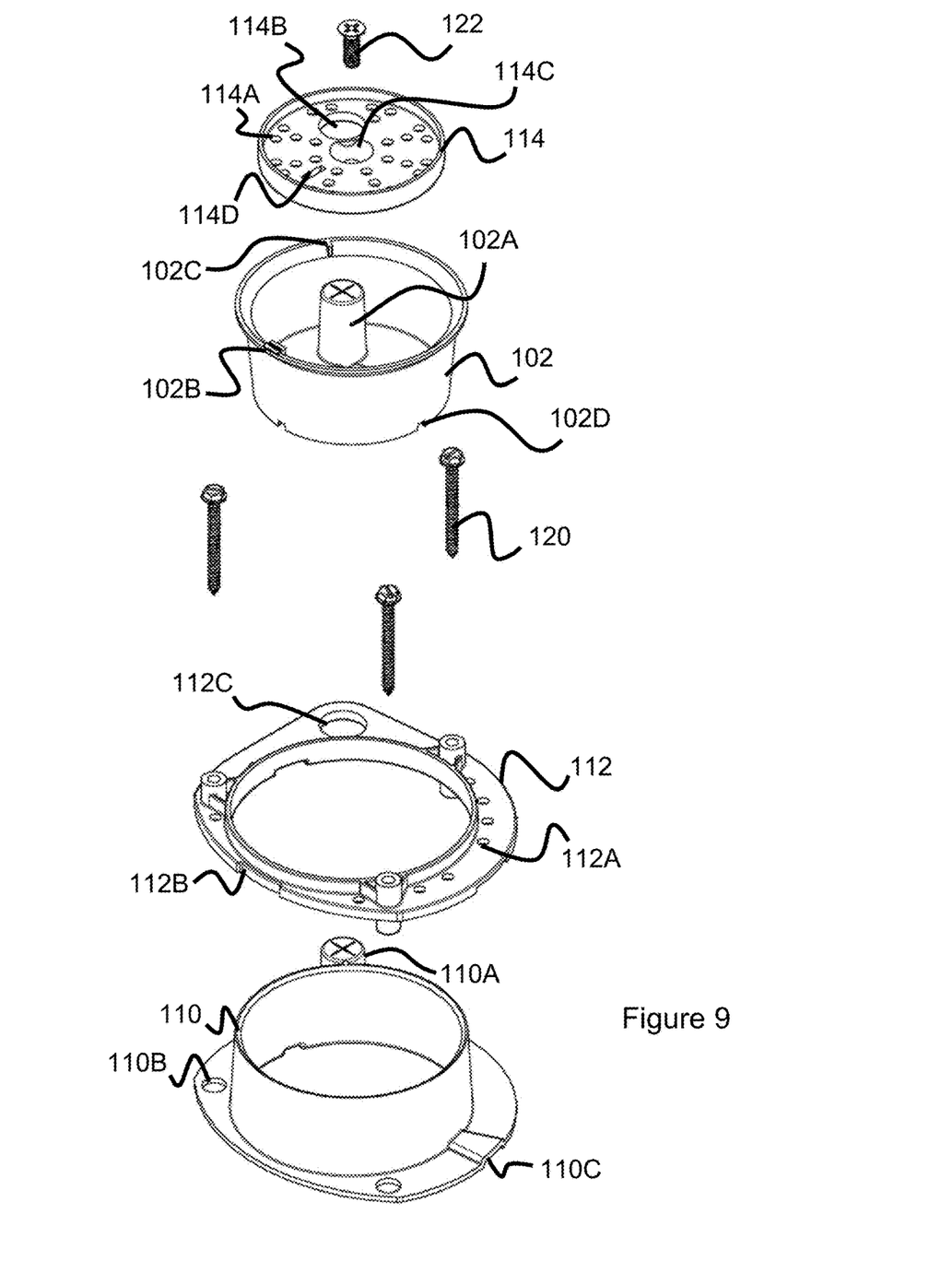
Figure 10:
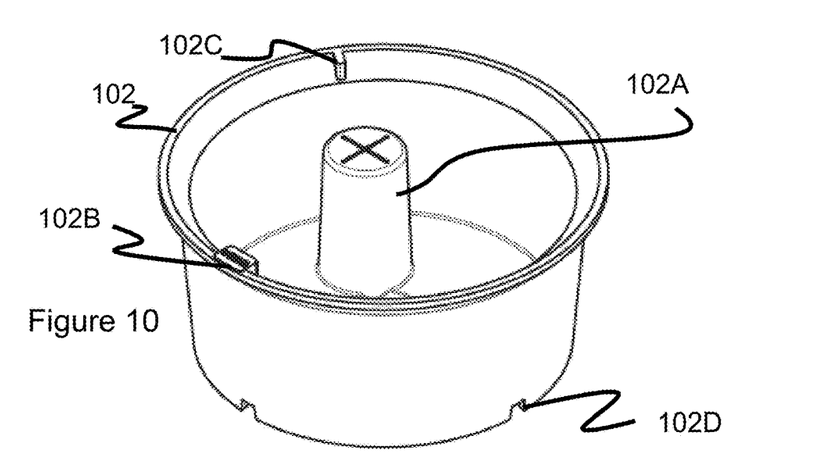
Figure 11:
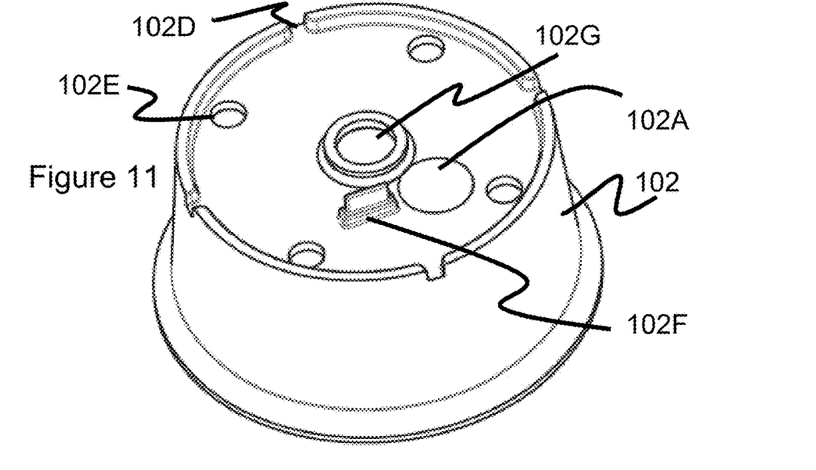
Figure 12:
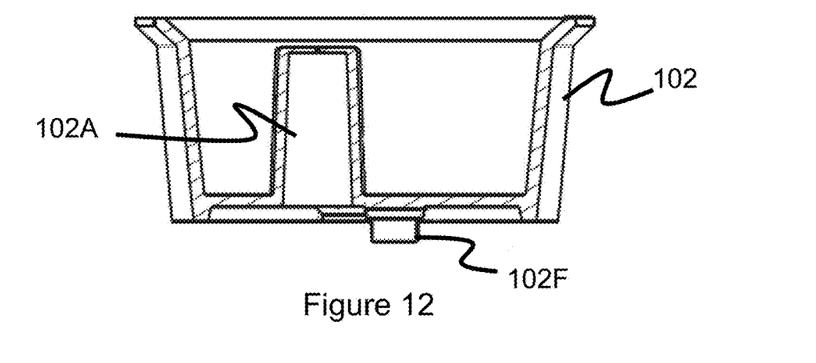
Figure 24:
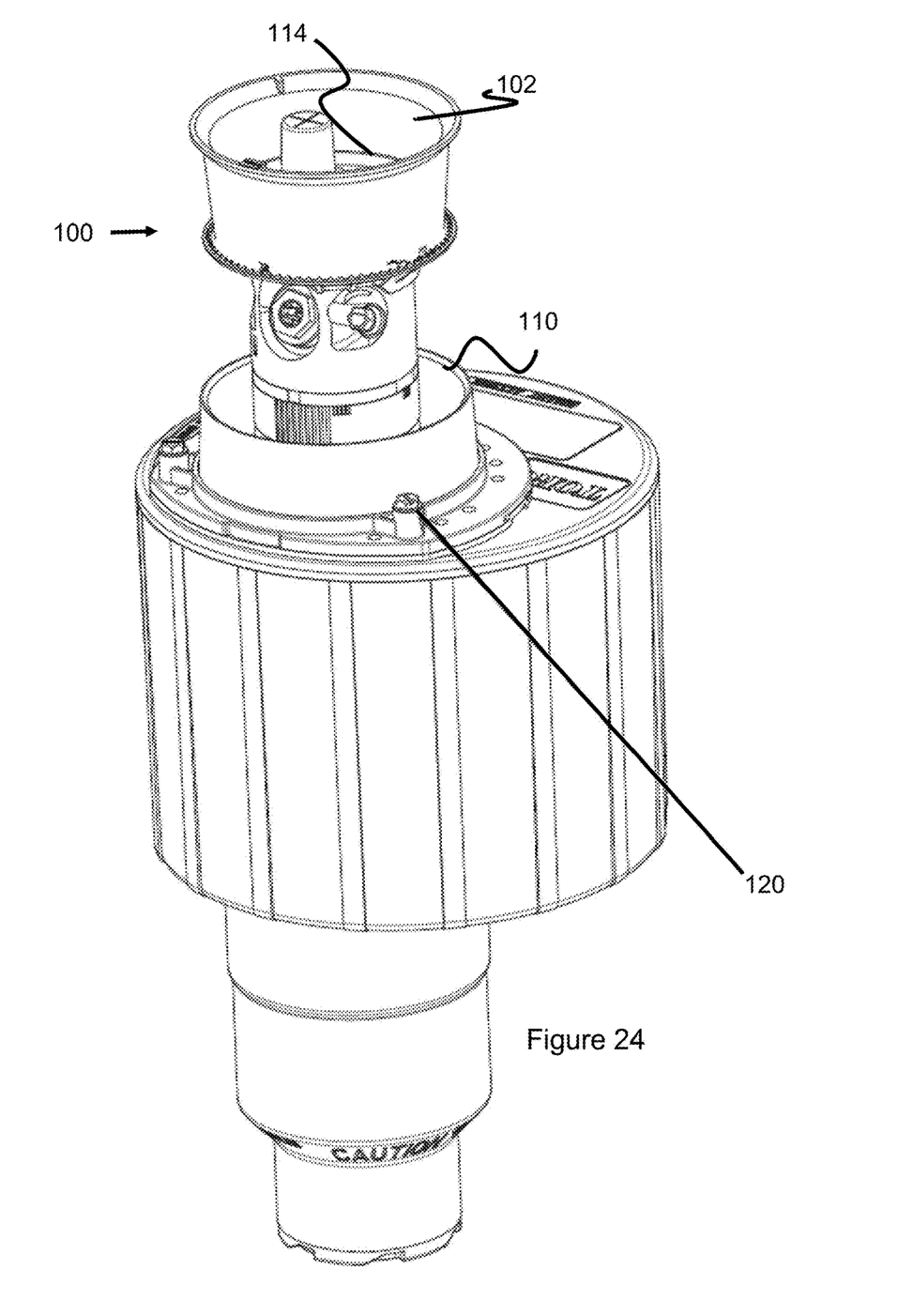

The cup assembly 100 is preferably composed of a cup portion 102 mounted on the sprinkler riser 106 and a surrounding sleeve portion 110 mounted on the top 103 of the sprinkler 101 surrounding the riser portion 106. The sprinkler 101 is preferably installed within the turf at a depth such that the top of the turf 104 in the cup portion 102 is level with the surrounding turf. Note, this is somewhat lower than typical sprinkler installations which are installed such that the top cover 103 is generally level with the surrounding turf. Hence, the sprinkler riser 106 can remain hidden when not in operation (FIGS. 2, 4, and 23) and can pop up during operation (FIGS. 1, 3, and 24).

As seen best in FIGS. 9-12, the turf cup 102 has a cylindrical cup shape with a plurality of drainage holes 102E that allow water to flow through the bottom. The bottom of the cup 102 also includes a lip extending downward around the circumference of the cup's bottom surface. The lip further includes channels 102D or breaks in the lip to further allow water drainage from within the cup. Preferably, the cup 102 also includes a raised marker member 102B that is aligned with the nozzle of the 108 of the sprinkler 101, thereby communicating the nozzle's position to a user. A second raised marker member 102C is also included and aligned to indicate to a user the watering trajectory adjustment location. A cylindrical, raised portion 102A within the cup 102 and having a split top allows a user to access the trajectory screw 105 of the sprinkler 101 with an elongated tool.

A retainer member 114 (FIGS. 13-15) is sized to fit within a bottom portion of the cup 102 and has a circumferential lower lip that allows top surface of the retainer member 114 to be located above the bottom of the cup 102. The retainer member 114 includes a plurality of drainage apertures 114A that allow for water drainage and for the roots of turf to grow into. A larger aperture 114B accommodates the cylindrical, raised portion 102A, while rectangular aperture 114D is position over feature 102F, which allows a user to engage the feature 102F with a tool to manually raise or lift the riser 106 when no in operation.

Figure 13:
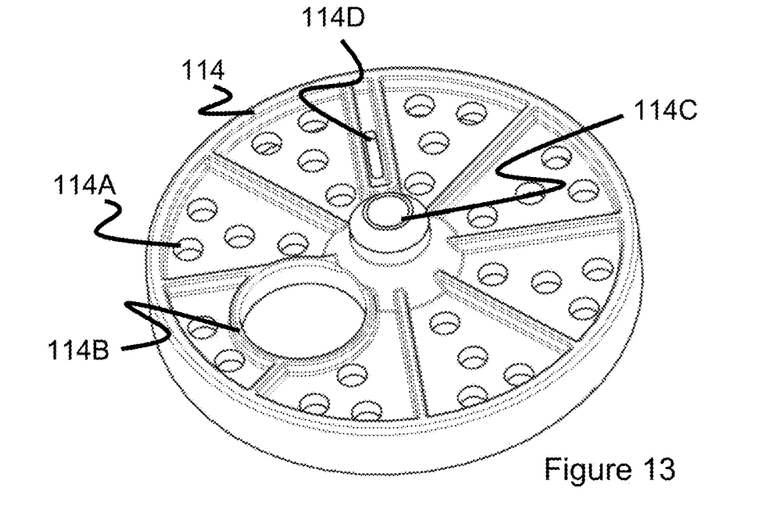
Figure 14:
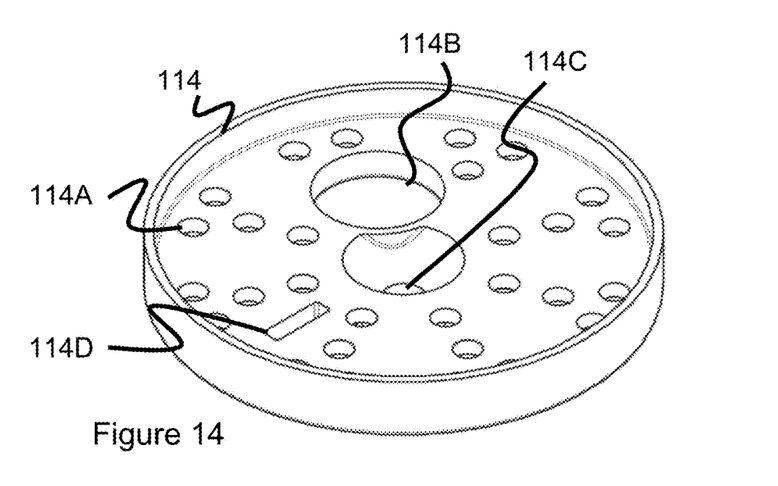
Figure 15:
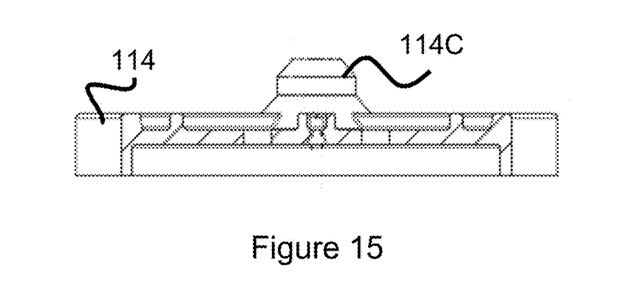

A screw 122 passes through a center aperture 114C, through center cup aperture 102G, and into the top of the riser 106.

Figure 19:
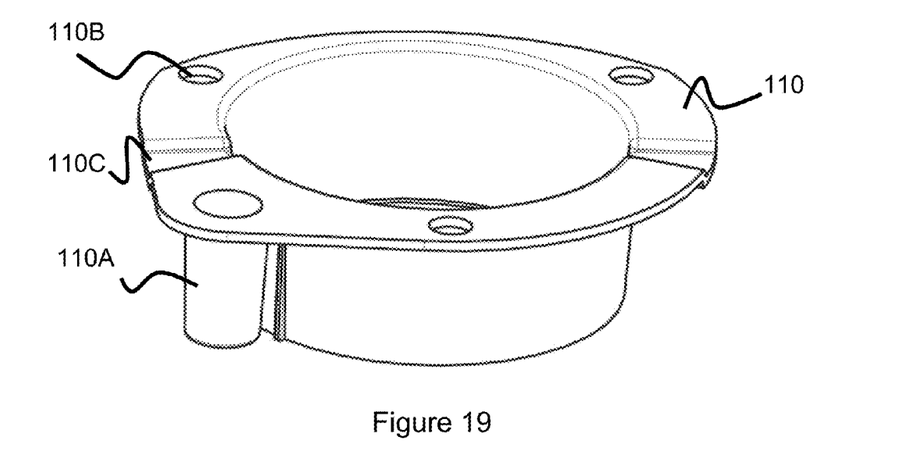
Figure 20:
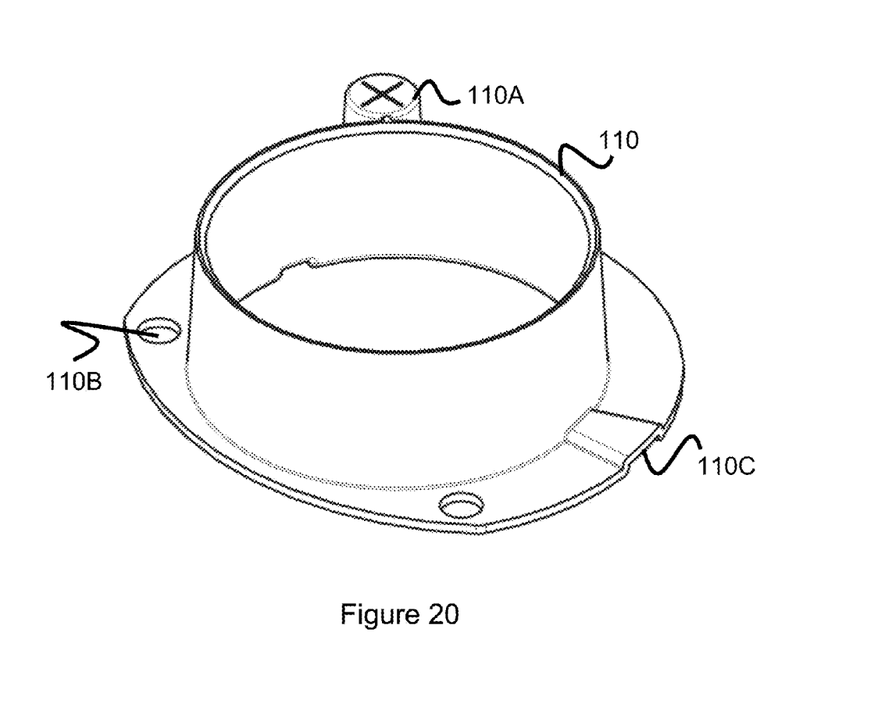
Figure 21:
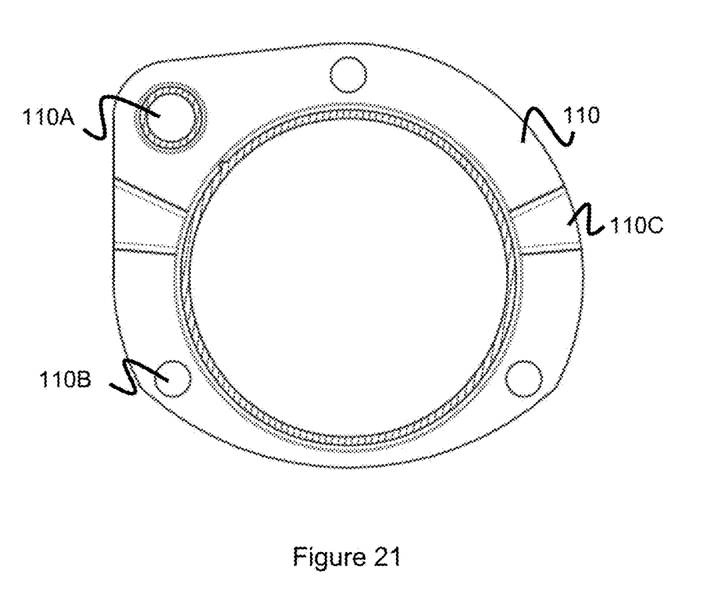
Figure 22:
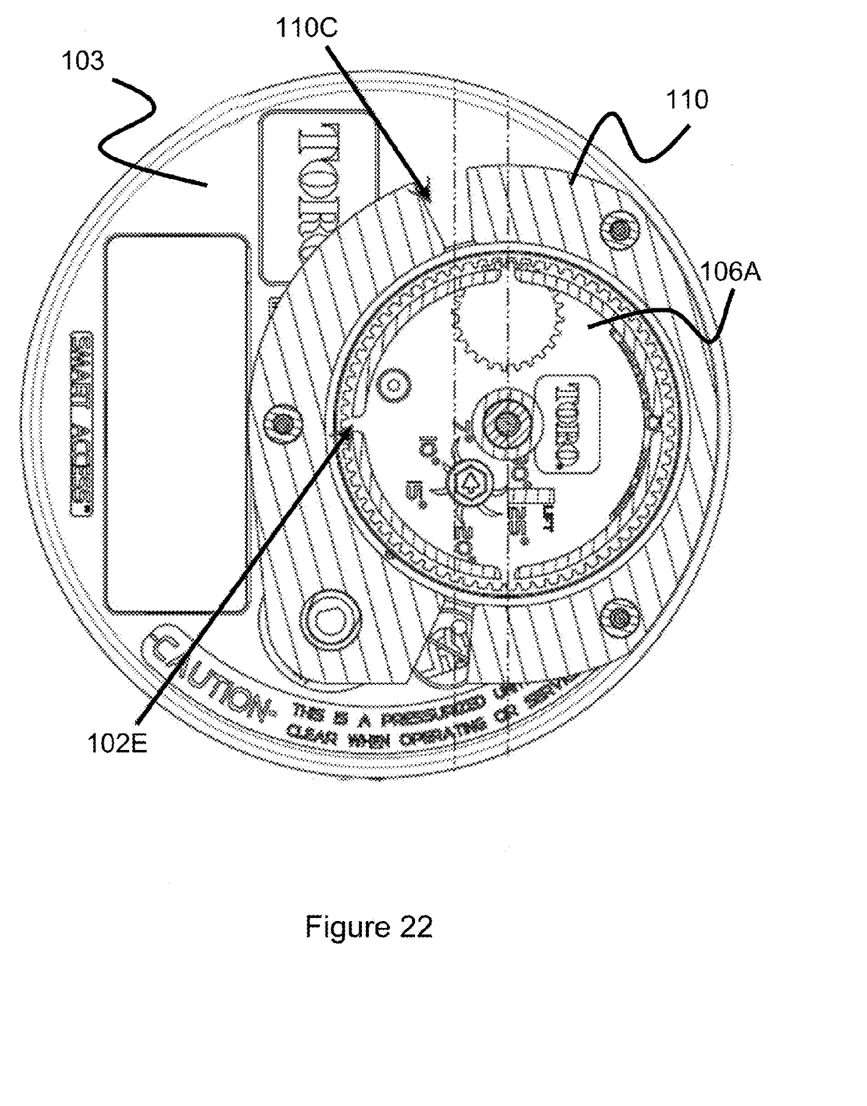
FIGS. 22-24 illustrates a sprinkler with a turf cup, according to the present invention.
Figure 23:
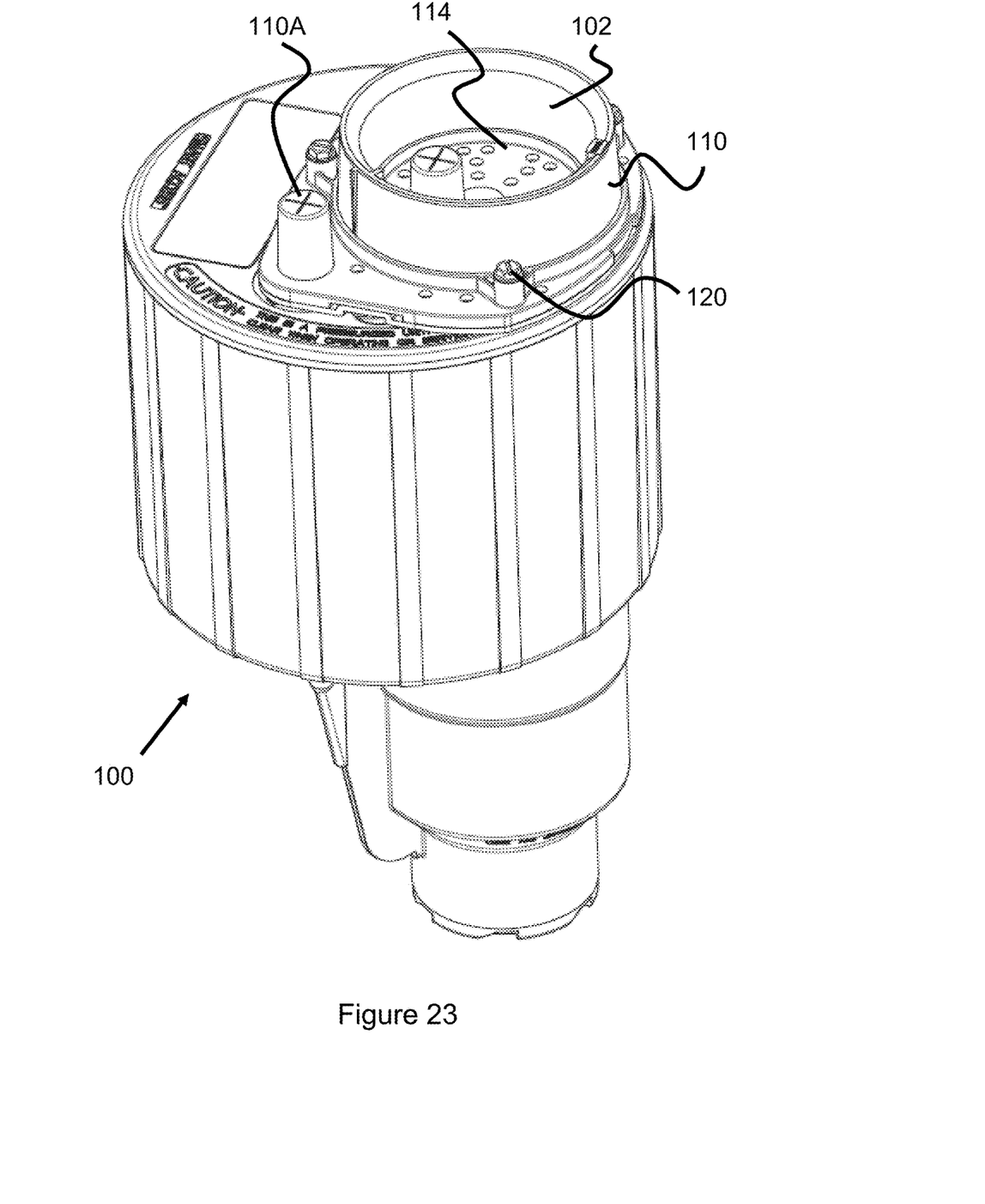

As seen best in FIGS. 19-21, the outer sleeve 110 has a cylindrical shape that is larger than the cup 102 and riser 106. A bottom portion includes a raised cylindrical portion 110A that provides access to an adjustment screw within the sprinkler 101. The bottom surface of the outer sleeve 110 includes channels 110C that allow water to drain during operation.

Figure 16:
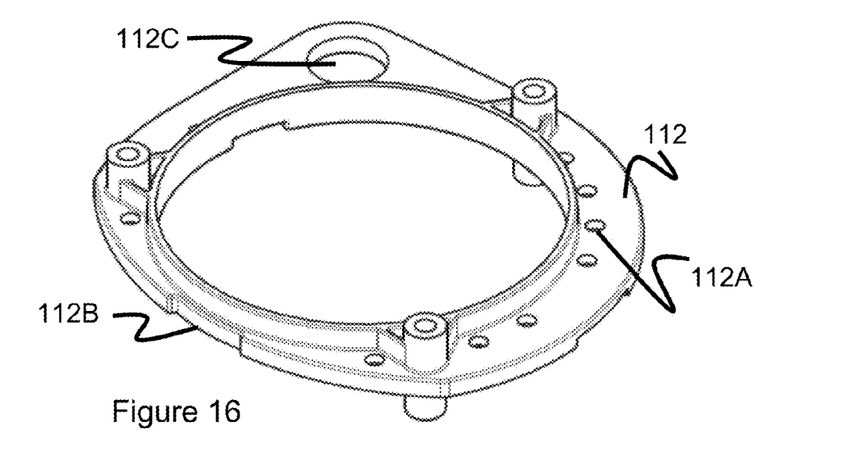
Figure 17:
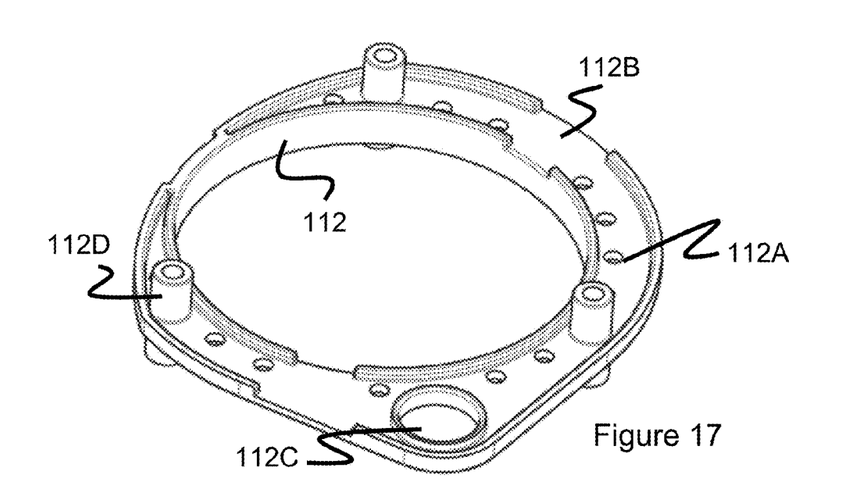
Figure 18:
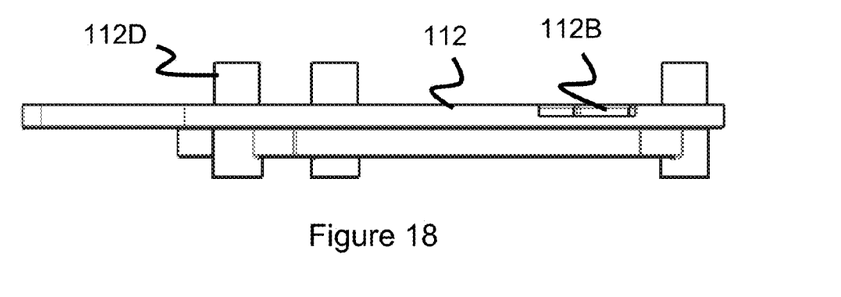

A sleeve retainer 112, seen in FIGS. 16-18, has a circular aperture that is sized to encompass the cylindrical portion of the sleeve 110. The sleeve is located over the bottom surface of the outer sleeve 110 and screw passages 112D are aligned with screw apertures 110G, allowing screws 120 to pass through each and further into the top 103 of the sprinkler 101. The sleeve retainer 112 includes a plurality of drainage aperture 112A, as well as channels or breaks 112B in the lips on the lower surface of the retainer 112. Aperture 112C accommodates the cylindrical adjustment portion 102A.

Preferably, the outer sleeve 110 is composed of a flexible material, such as rubber or silicone, while the sleeve retainer 112 is composed of a rigid material.

When irrigation commences, some water comes out of the nozzle 108 prior to the water pressure being sufficient to fully raise the riser. Similarly, as the water to the sprinkler 101 is shut off, some water is still pushed out of the nozzle 108. The outer sleeve member 110 prevents the turf and soil surrounding the sprinkler 101 from being washed away in these conditions. However, since this extra water from starting/stopping is contained in the sleeve member 110, it can otherwise cause the turf 104 within the turf cup 102 to be washed out. However, the apertures 114A and 102D, and channels 102E allow for drainage from the cup 102, and the channels 110C allow for drainage out of the sleeve 110. In this respect, the turf 104 within the cup 102 receives adequate drainage.

In one embodiment, the turf cup 102 is about 1.7 inches in height, the top of the outer sleeve 110 is about 1.64 inches from the top of the sprinkler and about level with the surrounding turf, and the nozzle 108 of the sprinkler 101 extends about 1.58 inches above the surrounding turf when raised and irrigating. In one embodiment, the center aperture of the sleeve retainer 112 is about 4.05 inches, the aperture of the sleeve 110 is about 3.69 inches, and the bottom diameter of the turf cup 102 is about 3.28 inches.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A turf cup assembly for an irrigation sprinkler, comprising:
    a cup having one or more cup drainage apertures; said cup being mountable on a top of riser of a sprinkler; and,
    a sleeve sized to encompass an outer perimeter of said cup and being mountable on a top surface of said sprinkler that surrounds said riser.

2. The turf cup assembly of claim 1, further comprising channels on a bottom surface of said sleeve that connect between an interior and exterior of said sleeve.

3. The turf cup assembly of claim 1, further comprising a retainer member fixed to a bottom, interior surface of said cup; said retainer member having a plurality of retainer drainage apertures.

4. The turf cup assembly of claim 1, further comprising a sleeve retainer having a retainer aperture sized to encompass said sleeve and being located over a portion of said sleeve.

5. The turf cup assembly of claim 1, further comprising a lip extending from a bottom exterior surface of said cup; said lip having a plurality of gaps.

6. The turf cup assembly of claim 1, wherein said cup further comprises a raised adjustment passage extending from a lower interior surface of said cup and being aligned with an adjustment mechanism for said sprinkler.

7. A turf cup assembly for an irrigation sprinkler, comprising:
    a cup having one or more cup drainage apertures through; said cup being mountable on a top of riser of a sprinkler; and,
    a sleeve sized to encompass said cup and being mountable on a top surface of said sprinkler; said sleeve having one or more drainage channels between an interior and an exterior of said sleeve.

8. The turf cup assembly of claim 7, further comprising a retainer member fixed to a bottom, interior surface of said cup; said retainer member having a plurality of drainage apertures.

9. The turf cup assembly of claim 8, further comprising a retainer member fixed to a bottom, interior surface of said cup; said retainer member having a plurality of drainage apertures.

10. The turf cup assembly of claim 9, further comprising a sleeve retainer having a retainer aperture sized to encompass said sleeve and being located over a portion of said sleeve.

11. The turf cup assembly of claim 10, further comprising a lip extending from a bottom exterior surface of said cup; said lip having a plurality of gaps.

12. The turf cup assembly of claim 11, wherein said cylindrical cup further comprises a raised adjustment passage extending from a lower interior surface of said cup and being aligned with an adjustment mechanism for said sprinkler.

13. A turf cup assembly for an irrigation sprinkler, comprising:
    a cup having one or more cup drainage apertures; said cup being mountable on a top of riser of a sprinkler;
    a retainer member fixed to a bottom interior surface of said cup; said retainer member having a plurality of retainer drainage apertures; and,
    a sleeve sized to encompass said cup and being mountable on a top surface of said sprinkler.

14. The turf cup assembly of claim 13, further comprising a sleeve retainer having a retainer aperture sized to encompass said sleeve and being located over a portion of said sleeve.

15. The turf cup assembly of claim 13, further comprising a lip extending from a bottom exterior surface of said cup; said lip having a plurality of gaps.

16. The turf cup assembly of claim 13, wherein said cup further comprises a raised adjustment passage extending from a lower interior surface of said cup and being aligned with an adjustment mechanism for said sprinkler.

17. The turf cup assembly of claim 1, wherein said cup has a cylindrical shape.

18. The turf cup assembly of claim 1, wherein said sleeve has a cylindrical shape.

19. The turf cup assembly of claim 7, wherein said cup has a cylindrical shape.

20. A turf cup assembly for an irrigation sprinkler, comprising:
    a cup having raised walls connected to a bottom surface and forming a top opening; said cup being mountable on a top of riser of a sprinkler; and
    a sleeve sized to encompass an outer perimeter of said cup and being mountable on a top surface of said sprinkler that surrounds said riser, so as to allow said riser to move vertically through an aperture of said sleeve.

* * * * *